Dec. 13, 1949     J. T. WHEELER     2,490,988
COLLAPSIBLE BABY CARRIAGE
Filed March 4, 1948     3 Sheets-Sheet 1
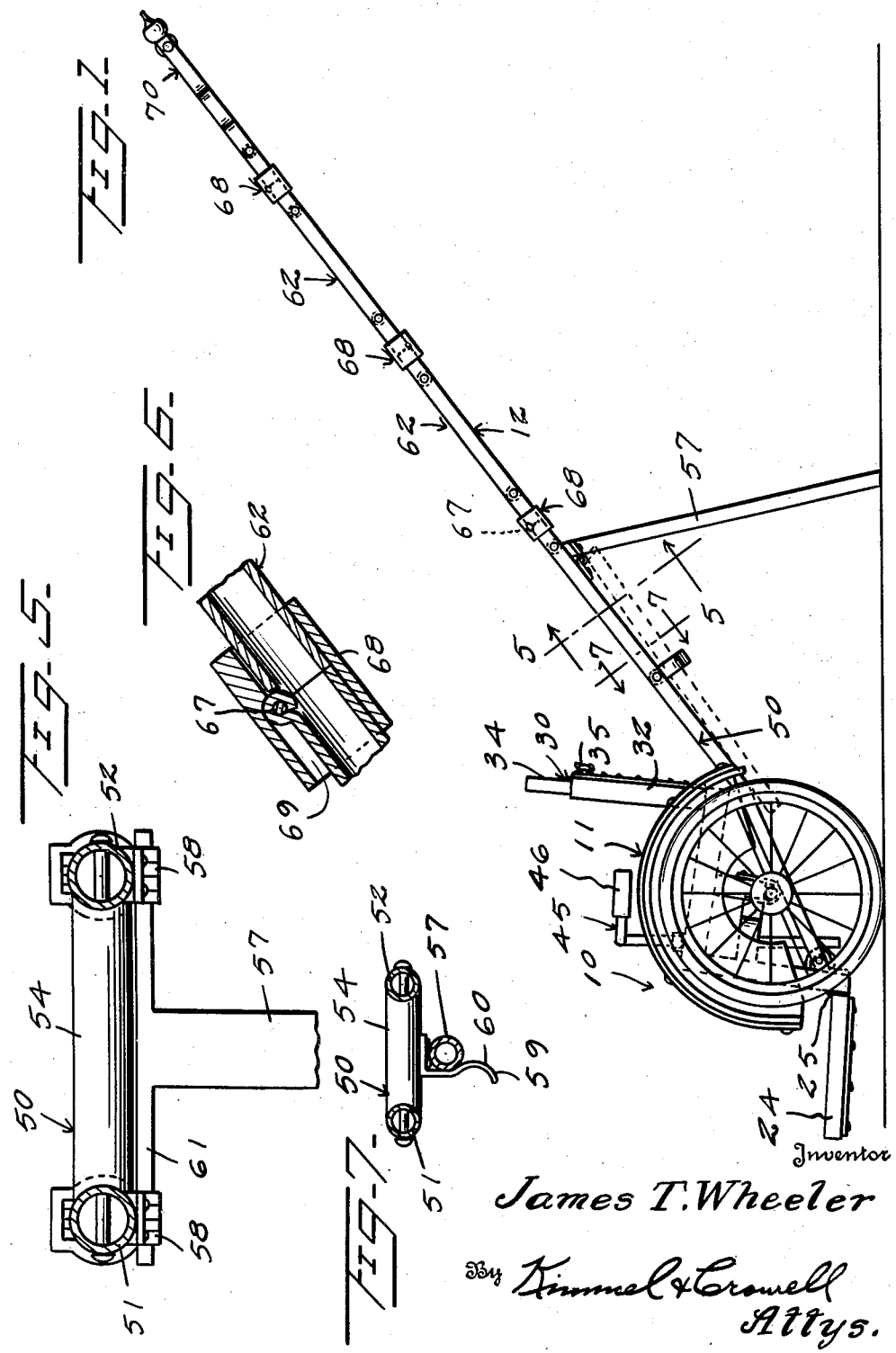
Inventor
James T. Wheeler
By Kimmel & Crowell
Attys.

Dec. 13, 1949 J. T. WHEELER 2,490,988
COLLAPSIBLE BABY CARRIAGE
Filed March 4, 1948 3 Sheets-Sheet 2
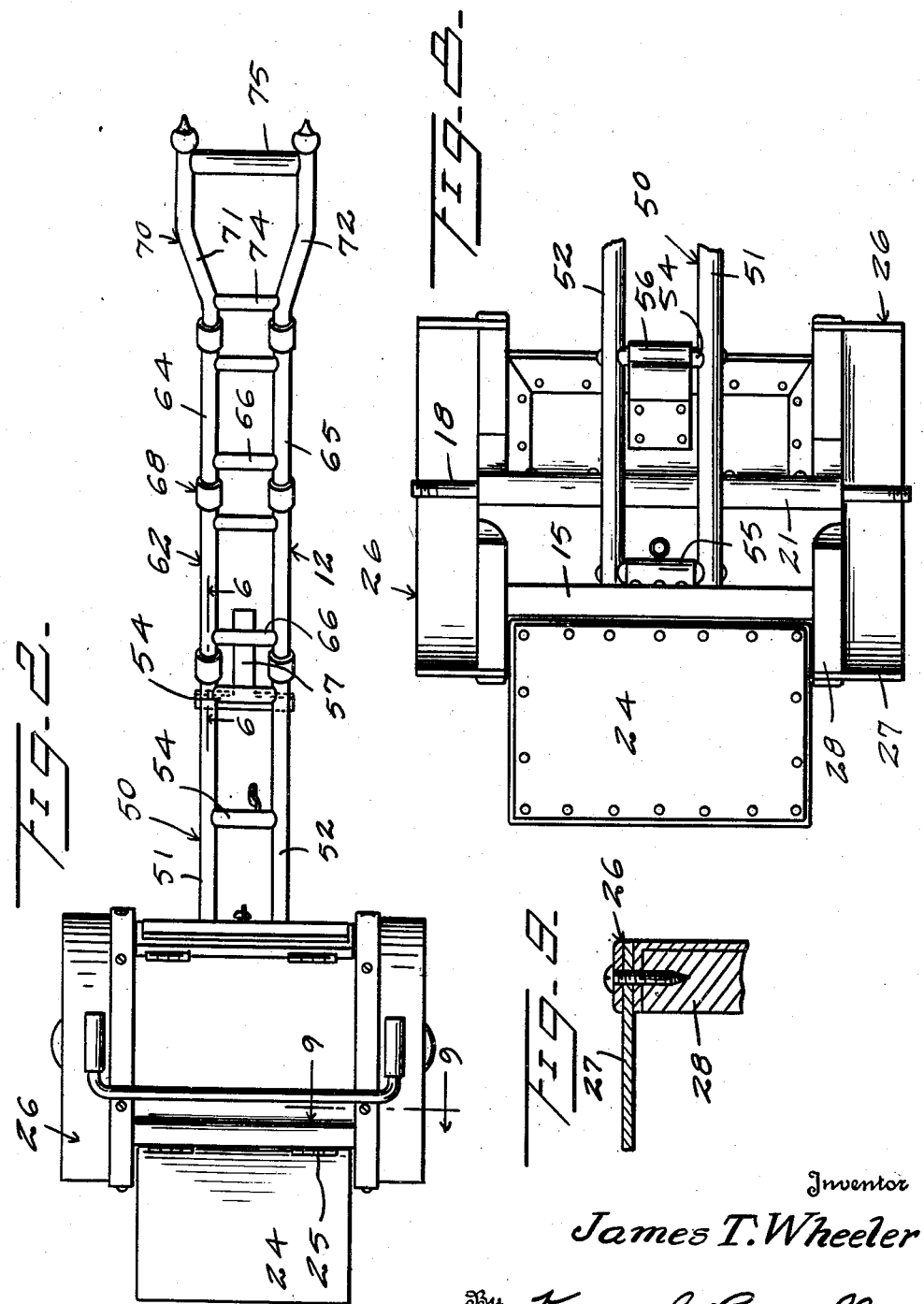
Inventor
James T. Wheeler
By Kimmel & Crowell
Attys.

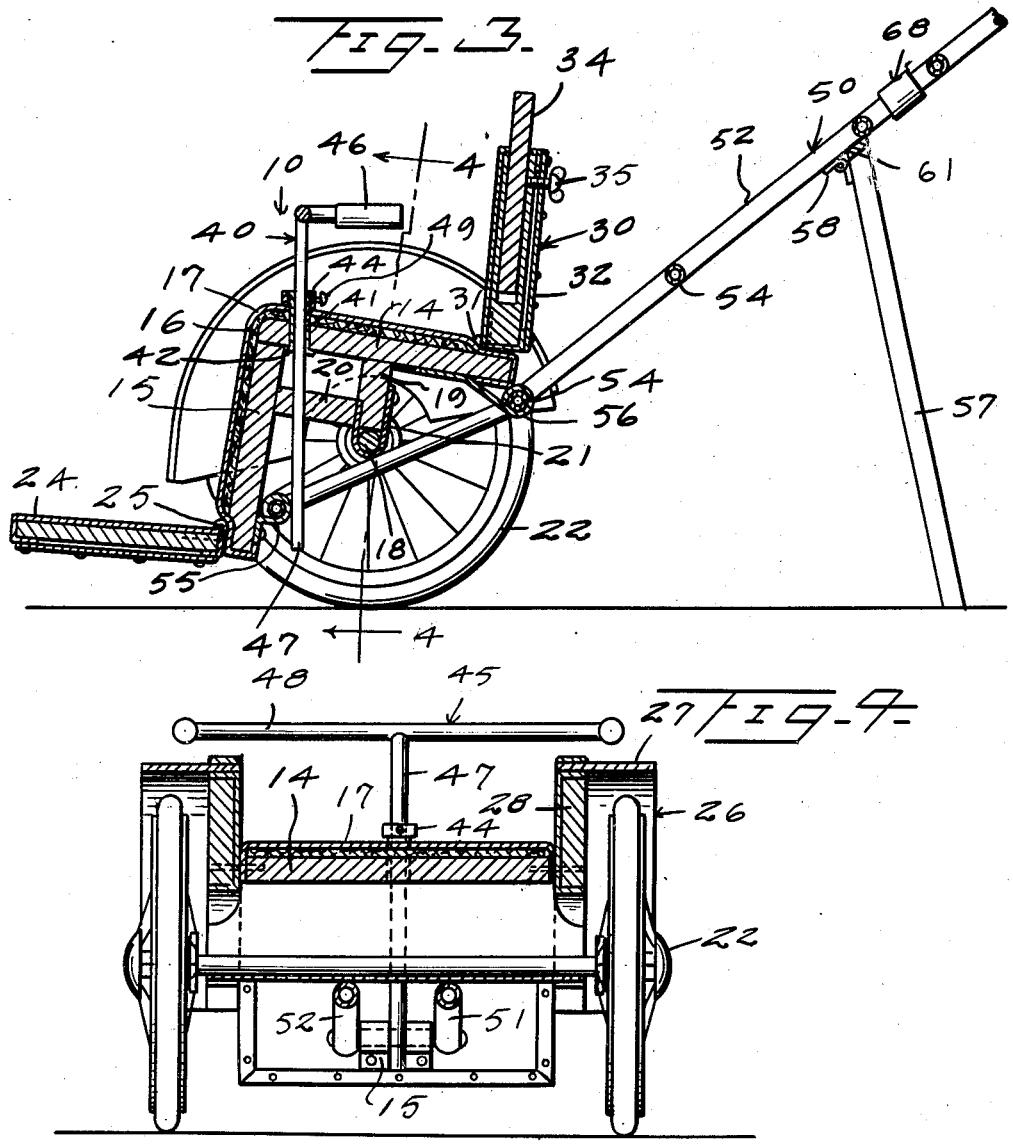

Patented Dec. 13, 1949

2,490,988

UNITED STATES PATENT OFFICE 2,490,988

COLLAPSIBLE BABY CARRIAGE

James T. Wheeler, Atlanta, Ga.

Application March 4, 1948, Serial No. 12,929

3 Claims. (Cl. 280—36)

This invention relates to improvements in baby-strollers or carriages and is directed more particularly to the provision of a baby-carrying device which is not only capable of rolling along the ground or other surface with the baby or other occupant well supported therewithin, but which is adapted to be collapsed or folded or otherwise have its component parts rearranged so that the apparatus may be easily transported from one place to another when the same is not in use.

That is to say, it is one of the principal objects of the invention to provide a manually-operable carriage which is capable of comfortably and safely moving the occupant over any surface but which may be collapsed into a relatively compact unit so that the person theretofore responsible with the movement of the occupied carriage may readily place the stroller, now that it is not actually in use, into such condition that it may be conveniently moved aboard a train, packed into an automobile, carried in one hand while the child is carried in the other, or in any other way transported with facility from one place to another. In other words, a special feature of the construction of the invention is such that the stroller when in operative position will safely carry the occupant on movable supports but at the same time, it is of a relatively light-weight construction and so formed that the compactness of its components when brought into collapsed position permit efficient and convenient movement thereof.

It is still another object of the invention to provide a baby-stroller which has a body support carried by a pair of rotatable wheels and an elongated but adjustable handle member extending rearwardly and upwardly from the support in such a way that the so-called "stroller" may conveniently propel the device without being required to bend over or otherwise place her or himself in an uncomfortable position while moving the device along the surface being traversed. The construction is such, as will appear, that the manually engageable member, through which the operator controls the movements of the device, is longitudinally, as well as angularly, adjustable relative to the body support so that neither the occupant nor the operator is required to be brought into positions which are contrary to the common rules of posture. This has the definite advantage of allowing the operator, whether it be the mother, father, nurse, or whomever, to both safely and comfortably adapt the apparatus to the convenience of the manipulator.

Still another object of the invention is the provision of a so-called baby-stroller or carriage which is capable of horizontal adjustment so as to accommodate occupants of varied pudginess but is also variable to permit occupancy by children or others having varying leg lengths. As is well known, the human structure is such that height, width, and weight are not too consistent wherefore it is advisable to provide a movable structure such as here mentioned which has the advantage of being adjustable in as many respects as possible.

A still further object and special feature of the invention is the provision of a stroller or carriage apparatus of the class referred to wherein there is a rotatably mounted or wheel supported carriage wherein the baby or other occupant may be suitably supported in a relatively erect position and have adjustable means whereby his or her back and posterior may be held within the proper relationship with the horizontal, as is required with occupants who need such maternal or other occupational therapy. As will be shown the apparatus of this invention provides for achievement in both these purposes.

Various other objects and advantages of the invention will become more apparent after a reading of the following description thereof and reference will be had to the accompanying drawings, wherein:

Figure 1 is a side elevational view of the device of the invention in operative position;

Figure 2 is a top plan view of the device as shown in Figure 1;

Figure 3 is a fragmentary sectional view of Figure 1;

Figure 4 is a sectional view taken on the line 4—4 of Figure 3;

Figure 5 is a sectional view taken on the line 5—5 of Figure 1;

Figure 6 is a sectional view taken on the line 6—6 of Figure 2;

Figure 7 is a fragmentary section taken on line 7—7 of Figure 1, the supporting leg shown in latched or folded position;

Figure 8 is a bottom plan view of the device of the invention with the usual wheels removed; and Figure 9 is a sectional view on the line 9—9 of Figure 2.

Referring to the drawings, the numeral 10 designates generally an improved collapsible baby-stroller having a lower front body portion 11 and a rearwardly extending foldable handle 12. The body is formed with a fixed seat 14 having a depending panel 15 at the front end thereof. The seat 14 and panel 15 are fixed together and may be covered with a cushion as 16 and outer covering 17 which extends over the upper surface of the seat 14 and panel 15.

A wheel axle 18 is carried by the body 10 below the seat 14 by a depending support 19 which is fixed at its upper end to the lower surface of the seat 14 and a rearwardly extending supporting member 20 which is fixed at its forward end to the rear side of the panel 15 below the seat 14. A strap as 21 forms the bearing at each end of the supports for the axle 18. Wheels as 22 are rotatably mounted on the opposite ends of the exle 18 on opposite sides of the seat 14.

A lower platform as 24 is hingedly mounted at the lower end of the front panel 15 by a hinge 25 which is fixed between the upper surface of the platform 24 and the forward surface of the panel 15. The rear edge of the horizontal platform 24 is adapted to abut the front surface of the panel 15 below the hinge 25 for supporting the platform 24 in a horizontal position. Normally the weight of the platform 24 will hold it in its extended horizontal position and the hinge 25 will provide for the folding upwardly of the platform to lie adjacent the panel 15 when the stroller is folded.

Fenders as 26 are fixed on opposite sides of the body 10 and house the upper portion of the wheels 22. The fenders 26 include a top wall as 27 which is disposed in spaced relation about the circumference of the wheel 22 at its upper end. An inner wall 28 is fixed to the side edges of the seat 14 and extends upwardly therefrom. The upper edge of the wall 28 is arcuate in configuration and the outer wall as 27 is fixed to the outer edge of the wall 28 to overly the wheels. A back member 30 is hingedly connected to the body 10 by a hinge 31. The back member 30 is formed of a lower portion 32 which is hollow and an upper or extensible panel 34 slidable within the hollow member 32. A set screw as 35 is threadably engaged through the rear surface of the pack member 32 for engaging with the extensible member 34 to fix the member 34 in selected adjusted position relative to the lower member 32 and to the seat 14.

When the extensible member 34 is enclosed within the member 32 the back member 30 may be folded forwardly to overly the seat 14 within the limits of the fenders 26. In this disposition of the back member 30 the extensible telescopically supported member 34 will also be disposed rearwardly of the forward edge of the seat 14.

A simulated steering or handle bar 40 is carried by the body 10 and disposed near the front edge of the seat 14. A bearing or bushing 41 having a lower flange 42 engages upwardly through the seat 14 at its forward edge intermediate the width thereof. The flange 42 will abut the lower surface of the seat 14 and the sleeve of the bearing 41 will extend upwardly beyond the upper surface of the seat.

A collar 44 threadably engages the upper end of the bearing 41 for supporting the bearing on the seat 14. The handle bar 40 is formed with a U-shaped upper member 45 having handles as 46 at the extreme ends of the arms thereof. A depending supporting bar 47 is fixed at its upper end midway the length of the bight 48 of the bar 45 and extends downwardly through the bearing or bushing 41. A set screw as 49 engages through the collar 44 above the bushing 41 for engagement with the arm 47 to fix the handle bar 45 in selected position relative to the seat. The handle bar 45 may be adjusted vertically in the bushing 41 by loosening the set screw 49 and sliding the arm 47 upwardly or downwardly as desired to the selected position where the set screw 49 may then be tightened.

The folding handle 12 is carried by the body 10 and extends rearwardly and upwardly therefrom. The handle 12 is formed of a plurality of handle sections or members hingedly connected together for folding one upon the other. The handle 12 includes a lower handle member 50 which is adapted to be fixed to the body 10. The member 50 is formed of a pair of parallel spaced apart arms 51 and 52 which are connected together by cross members 54 fixed at each end of the members 51 and 52 and intermediate the length thereof. A metal strap as 55 is fixed to the rear surface of panel 15 and encircles the lowermost of the cross bars 54 of the lower handle member 50. A second strap as 56 is fixed to the lower surface of the seat 14 at the rear end thereof and encircles one of the intermediate cross bars 54 for fixedly securing the lower fixed handle member 50 to the body 10. The member 50 is disposed in a rearwardly and upwardly inclined angular position relative to the seat and body in the normal position thereof.

A supporting member as 57 is hingedly connected to the fixed handle member 50 by the hinges 58 which are fixed on the arms 51 and 52. A hinge 58 is fixed on each one of the side arms of the member 50. A resilient clip as 59 is fixed to one of the upper intermediate cross bars 54 of the handle member 50. The supporting member 57 is adapted to be engaged by the resilient hook 60 of the latch 59 when the member 57 is swung upwardly and forwardly about the hinge 58. A flat transverse bar 61 is carried by the upper end of the member 57 and the hinges 58 connect to the ends of the bar 61. The bar 61 also is provided for abutting the lower surface of the longitudinal members 51 and 52 in the downwardly and rearwardly swung position of the supporting member 57 for limiting the rearward disposition and rocking movement thereof.

In the rearwardly extended position of the supporting member 57, the lower end of the supporting member is adapted to engage on the ground for supporting the body 10 in an erect position. When the stroller is in motion, it is desired to raise the supporting member 57 so that the stroller may be supported by the operator. When the stroller is in motion the supporting member 57 may be then swung forwardly about the hinge 58 and engaged with the latch or keeper 59.

The handle 12 is completed by a plurality of hingedly connected handle sections 62 which extend upwardly and rearwardly from the lower handle member 50. Each of the handle sections 62 is formed with oppositely disposed longitudinal members 64 and 65 which are connected together by intermediate braces 66. The cross bars or braces 66 are disposed between the members 64 and 65 in spaced relation relative to the terminal ends thereof. A hinge as 67 is provided between adjacent sections 62 and is fixed at each end of the intermediate members 62. The hinges 67 which are supported on any one of the handle members 62 are disposed on opposite sides at the opposite ends thereof. In this manner one of the handle members 62 may be rocked in one direction for overlying a lower member and the next member 62 may be rocked in the opposite direction so that all of the handle sections will be stacked one upon the other in the completely folded position of the handle 12. The lowermost of the sections 62 is hingedly connected to the upper end of the fixed handle section 50 and the hinge 67 therebetween is disposed on the upper side of the handle 12 so that the lower member 62 may be disposed upwardly relative to the fixed member 50.

For securing the handle 12 in the completely extended position, I have provided a slide member as 68 on each of the members 62. The slide member 68 is tubular for engagement about the longitudinal members 64 and 65 and is slidable thereon. A recess as 69 is formed at one end of each of the slide members 68 opening downwardly therefrom. The slide member 68 is adapted to be disposed in its lowered position over the lower end of one of the members 62 and over the upper end of the adjacent member for locking these two members in extended position. The hinge 67 is adapted to be disposed within the recess 69 so that the member 68 may slide downwardly from one member 62 over the hinge and enclose the upper end of the adjacent member 62 on the member 50.

A handle as 70 is fixed to or carried by the uppermost of the members 64 and is formed with a pair of oppositely disposed longitudinal members 71 and 72 connected together by cross bars 74 and 75. The uppermost cross bar 75 will constitute the hand grip for the entire stroller. Slide members as 68 are carried by the side members 71 and 72 in the same manner as the slide members 68 carried by the longitudinal side members 64 and 65 of the intermediate handle sections 62.

In the use and operation of this stroller the normal position is shown in Figures 1 and 2 of the drawings. The handle 12 is completely extended and the platform and back are swung outwardly relative to the seat. When it is desired to fold the stroller for carrying or transportation in a confined area, the slide members 68 may be slid upwardly on their respective supporting elements and the members 70 and 62 may be folded one upon the other and upon the fixed member 50 rearwardly of the body 10. The telescoping portion 34 of the back will be disposed within the fixed portion 32 thereof so that the back 30 may be folded over the seat 14 and the platform 24 is folded upwardly to abut the panel 15. The supporting member 57 is engaged in its latch 59 for completing the folding of the entire stroller.

I claim:

1. An improved stroller of the kind described, comprising a seat member, a back hingedly connected to said seat member, a depending panel on the front edge of said seat, a horizontal platform hingedly connected to the lower edge of said panel, a wheel axle supported below said seat, wheels on said axle on opposite sides of said seat, fenders about the upper portion of said wheels and fixed on said seat, an elongated handle for said stroller fixed at the lower end thereof to said seat and said panel, said handle including a plurality of elongated members hingedly connected to an adjacent member, means slidably carried by certain of said members engageable over a portion of said certain member and adjacent member securing said hinged members in alignment.

2. An improved stroller of the kind described, comprising a body including a seat, an extensible telescopic back member hingedly connected to said seat, a downwardly extending panel on the front of said seat, an upwardly swinging platform on the lower end of said panel, wheels mounted on said body, fenders about the upper portion of said wheels and fixed to said body, a handle bar carried by said seat at the front end thereof and above the upper surface of said seat, means adjustably securing said handle bar on said seat for vertical adjustment relative thereto, a handle fixed to said body extending rearwardly and upwardly therefrom, said handle including a plurality of handle forming members, means hingedly connecting each of said members to an adjacent member, means securing said members in fixed alignment with an adjacent member, a stroller supporting member hingedly connected to one of said handle members and extending downwardly therefrom for supporting the body erect on a supporting plane, and a resilient latch on said stroller with which said supporting member is engageable in the raised position thereof.

3. An improved stroller of the kind described, comprising a body including a fixed seat, wheels on said body on opposite sides of said seat, fenders over said wheels fixed to said body, a back member hingedly connected to said body for folding over said seat, a horizontal platform hingedly mounted on said body for folding to a vertical position at the front of said seat, a supplementary extensible back slidably carried by said back member, a folding handle, said handle including a lower handle member fixed to said body and extending angularly upwardly therefrom, and a plurality of hingedly connected handle members, means hingedly connecting one of said latter handle members to said fixed handle member, the hinge connection between adjacent handle members being disposed on opposite sides from the adjacent hinge connection whereby said handle members may be folded one upon the other and upon said fixed handle member.

JAMES T. WHEELER.

REFERENCES CITED

The following references are of record in the file of this patent:

FOREIGN PATENTS

| Number | Country | Date |
| --- | --- | --- |
| 414,349 | Germany | June 3, 1925 |